United States Patent [19]
Fronk

[11] Patent Number: 4,483,499
[45] Date of Patent: Nov. 20, 1984

[54] SYSTEM AND METHOD FOR LOADING CARGO INTO LIGHT AIRCRAFT

[76] Inventor: David Fronk, 481 S. 925 West, Orem, Utah 84057

[21] Appl. No.: 502,456

[22] Filed: Jun. 9, 1983

[51] Int. Cl.³ .............................................. B64D 9/00
[52] U.S. Cl. ............................. 244/118.1; 244/118.5; 244/137 R; 296/19; 414/532
[58] Field of Search ............... 244/118.1, 118.5, 118.6, 244/122 R, 137 R, 137 P; 414/532–534; 296/19, 20, 3, 10

[56] References Cited

U.S. PATENT DOCUMENTS

| | | |
|---|---|---|
| 2,254,194 | 8/1941 | Augustine ............................ 414/534 |
| 2,347,002 | 4/1944 | Schofield ............................. 414/534 |
| 3,181,823 | 5/1965 | Gillmore ........................... 244/137 P |
| 3,356,236 | 12/1967 | Shaw et al. ....................... 244/137 R |
| 3,914,337 | 3/1976 | Molten et al. .................... 244/137 P |
| 4,077,590 | 3/1978 | Shorey ................................ 414/532 |
| 4,115,884 | 9/1978 | Keogh ................................... 296/19 |
| 4,352,991 | 10/1982 | Kaufman ............................. 296/20 |

FOREIGN PATENT DOCUMENTS

| | | | |
|---|---|---|---|
| 1177283 | 9/1964 | Fed. Rep. of Germany ........ 296/19 |
| 196636 | 6/1965 | Sweden ................................. 296/19 |
| 876150 | 8/1961 | United Kingdom ............ 244/137 R |

Primary Examiner—Galen L. Barefoot
Attorney, Agent, or Firm—Workman, Nydegger & Jensen

[57] ABSTRACT

A system and method for converting the interior of a light aircraft such that it can be used to transport patients or cargo. The seats and other fixtures are removed from the aircraft cabin and a rack-like structure is temporarily secured to the tracks in the floor along one side of the cabin. A moveable ramp is secured to the tracks in the floor of the cabin adjacent the door such that it can be positioned in the doorway to extend from the door to the rack-like structure for loading and unloading. A stretcher or cart having casters on the bottom thereof is placed on the ramp and rolled onto the rack-like structure.

27 Claims, 5 Drawing Figures

Fig. 2
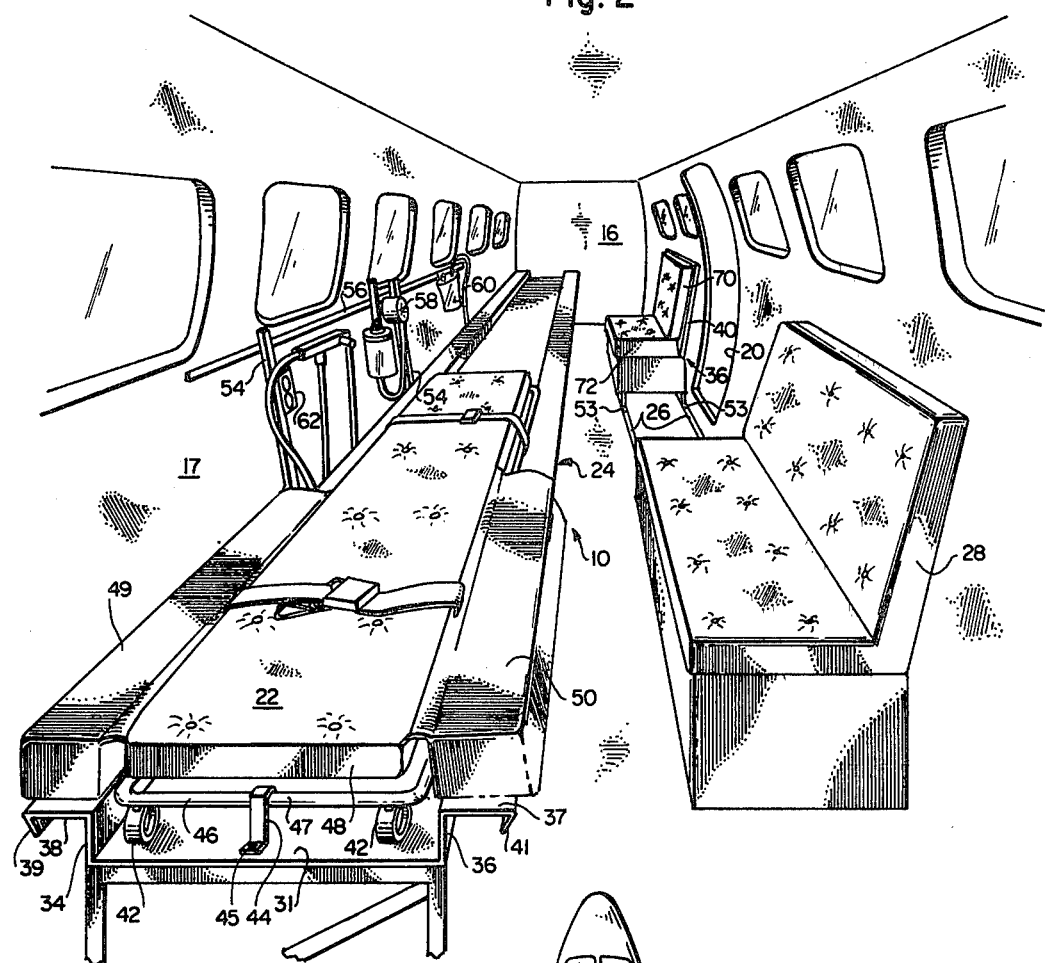
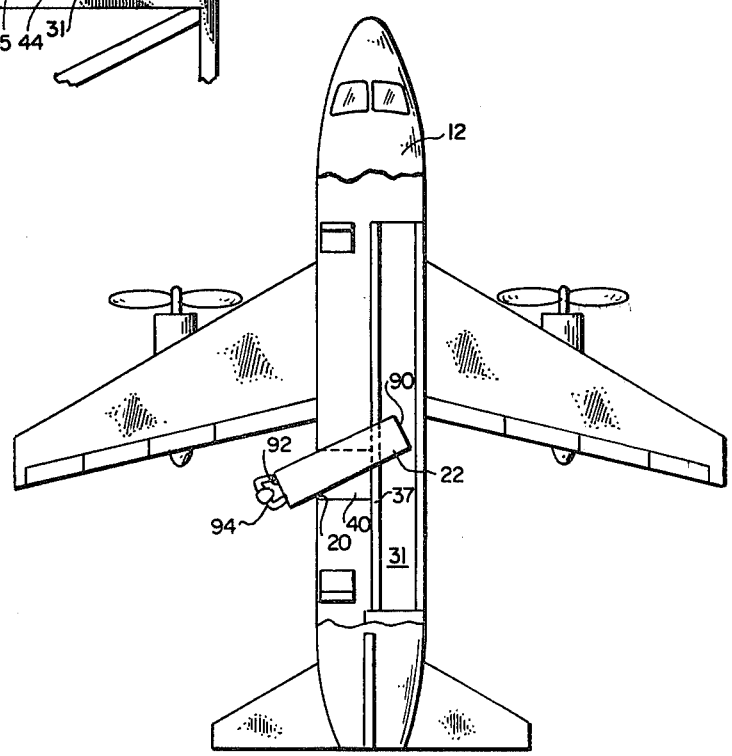
Fig. 3

4,483,499

SYSTEM AND METHOD FOR LOADING CARGO INTO LIGHT AIRCRAFT

BACKGROUND

1. Field of the Invention

The present invention relates to systems for loading and transporting cargo in an airplane cabin and, more particularly, to a novel, modular system and method which can be used to temporarily convert an executive type airplane into a light cargo plane.

2. The Prior Art

Where it is important to travel long distances quickly, small, light aircraft have found numerous uses. These aircraft are often used by corporate executives to travel to distant locations without having to rely upon the limited and sometimes unreliable commercial airline schedules. Additionally, these light aircraft can be used to transport cargo in emergencies or to transport cargo to remote locations.

It has also be found advantageous to transport critically ill or injured patients in small airplanes. Recent advances in the medical field have made it possible to save the lives of persons who would have died under similar circumstances a few years ago. However, in order to provide these life saving treatments it is first necessary to transport the patients to hospitals having the specialized equipment and specially trained doctors to perform the necessary procedures. Small airplanes and helicopters have been utilized as air ambulances to transport such patients.

Two of the major advantages of using small, light aircraft are location and timing. With a small airplane it is possible to quickly travel to locations which are not serviced or which are only irregularly serviced by commercial airlines. Also, with a small airplane, it is possible to make the trip at almost any time during the day or night. Accordingly, some large corporations have found it advantageous to own their own airplanes. However, many corporations cannot afford to maintain a plane full time because of the high cost involved. In order to justify the cost of maintaining an airplane, it must generally be used to its fullest potential.

One method which has been devised for solving this problem is for a private pilot to own his own plane which he leases, along with his own services, to several different corporations or individuals. In this manner, each of the individual corporations can have the benefit of utilizing a small aircraft but only pay a fraction of the cost.

Another means which could be utilized to help make it more cost effective to own and operate a small airplane would be to diversify the uses for which the airplane is utilized. For example, if the airplane could be used to haul cargo as well as to transport executives, it would be more cost effective. However, in order to utilize a small airplane for diversified purposes, it is usually necessary to modify the interior of the airplane cabin.

When a small airplane is used to transport executives or other persons, the cabin must be equipped with chairs for the executives to sit in and tables at which they can work. When an airplane is used to transport cargo, the cabin must be equipped with racks to secure the cargo in place. If the airplane is used as an air ambulance to transport patients, the interior of the airplane must be equipped with a litter module on which the patient can lie, medical equipment to support the patient, and seats which are turned sideways in the aircraft such that nurses and other attendants can attend to the needs of the patient during flight.

At the present time, there is no convenient way for quickly and easily converting the interior of an airplane from one use to another use. Additionally, the present state of the art often requires that structural changes be made in the airplane to adapt the airplane to a particular purpose.

For example, as mentioned previously, an air ambulance has to be equipped with oxygen tanks, an invertor, a vacuum pump, and other medical equipment such that the nurses can provide for the needs of the patient during flight. At the present time, much of this equipment is positioned in the nose of the airplane and lines must be run through the walls of the airplane and into the cabin, thus requiring structural changes to be made in the airplane.

Also, depending upon the size of the airplane used for air ambulances, it is often difficult or impossible to load the patients into the airplane while they are lying on stretchers. The airplanes which are generally used for air ambulances have cabins which are only about four or five feet in width and about four or five feet in height. Thus, there is very little room in which to maneuver the stretcher on which a patient is lying. Once inside the airplane, the nurses and medics who usually carry the patient are unable to stand upright and must carry the stretcher in a stooped position which places a substantial physical strain on them.

Additionally, most light airplanes only have one cabin door which is generally only about eighteen inches wide, which is narrower than a standard sized stretcher. Thus, the stretcher cannot fit through the door while the stretcher is lying flat, nor can the stretcher be turned such that it runs lengthwise in the airplane. Accordingly, it is necessary to modify the door of the cabin to provide a means for loading the stretcher and patient.

Under the current state of the art, this modification is generally accomplished by forming a supplementary door next to the existing door. These supplementary doors usually swing outward being hinged along one side to provide a large opening through which a stretcher can be maneuvered. In order to form these supplementary doors, it is necessary to cut out a portion of the side of the airplane which upsets the structural integrity of the aircraft. Accordingly, special steps have to be taken to add reinforcement means back into the body of the airplane. The cost of forming this additional door and the other modifications necessary to convert an airplane into an air ambulance generally run on the order of about $100,000.

Accordingly, it would be a significant advancement in the art to provide a modular system for easily and quickly converting the interior of an airplane cabin such that it could be used for many different purposes. It would be a further advancement in the art to provide a system for converting an airplane into an air ambulance or into a cargo plane which does not necessitate the forming of a supplementary door in the side of the cabin or making other structural changes in the airplane and which also facilitates the loading of patients or cargo. Such a system is disclosed and claimed herein.

OBJECTS AND BRIEF SUMMARY OF THE INVENTION

It is a primary object of the present invention to provide a modular system and method for converting the interior of a light airplane so that cargo can easily be loaded or unloaded into or out of the airplane and which does not require extensive changes in the airplane.

It is a further object of the present invention to provide a modular system and method for converting an airplane into an air ambulance in which it is relatively easy to load a patient into the airplane through the existing door.

Another object of the present invention is to provide an air ambulance stretcher system which is self-contained and can easily be removed from the aircraft such that the aircraft can be used for other purposes.

A further object of the present invention is to provide a modular conversion system which can easily be adapted to many different types of small aircraft.

These and other objects and features of the present invention will become more fully apparent from the following description and appended claims, taken in conjunction with the accompanying drawings.

In accordance with the foregoing objects, the present invention comprises a modular system and method for converting an airplane into a cargo plane or an air ambulance. The system is self-contained and is sized such that it does not require structural changes to be made in the airplane. Accordingly, the system can easily be installed in existing aircraft and can be removed when it is desirable to use the aircraft for other purposes.

The present invention includes a rack-like structure which is positioned along one side of the cabin to support cargo or the stretcher on which a patient is placed. In one preferred embodiment, the upper surface of the rack-like structure is covered with a generally planar top having lips extending upwardly from the lateral edges thereof. When the system is used in an air ambulance, these lips act as guide rails to guide casters which are placed on the bottom of the stretcher such that the stretcher can easily be rolled into place on the rack-like structure.

A moveable loading ramp is provided to direct cargo or the stretcher on which a patient is lying through the door of the airplane and onto the rack-like structure. In a preferred embodiment, the loading ramp comprises a seat which can be moved such that it is positioned in front of the door and which has a collapsible back. The back of the seat is folded down such that it extends from the doorway of the airplane to the edge of the top of the rack-like structure. Thus, the end of a stretcher or cart can be positioned through the door onto the loading ramp and can be pushed and directed such that it rolls on its casters and can be directed into position.

BRIEF DESCRIPTION OF THE DRAWINGS

Reference is next made to the drawings, in which like parts are designated with like numerals throughout, and in which:

FIG. 2 is a perspective view of a cabin of an airplane illustrating the stretcher system embodiment of the present invention which is used in air ambulances.

FIG. 3 is a top view of an airplane with a portion of the top of the cabin being broken away to show the method by which a stretcher is loaded into an air ambulance according to the present invention.

DETAILED DESCRIPTION OF THE PREFERRED EMBODIMENT

The present invention is directed to a modular system and method which can be utilized to convert the interior of an airplane cabin so that it can be used to transport cargo or patients. The system can quickly and easily be installed in or removed from the airplane, thus allowing the airplane to be readily adaptable to different uses.

Figure 1:
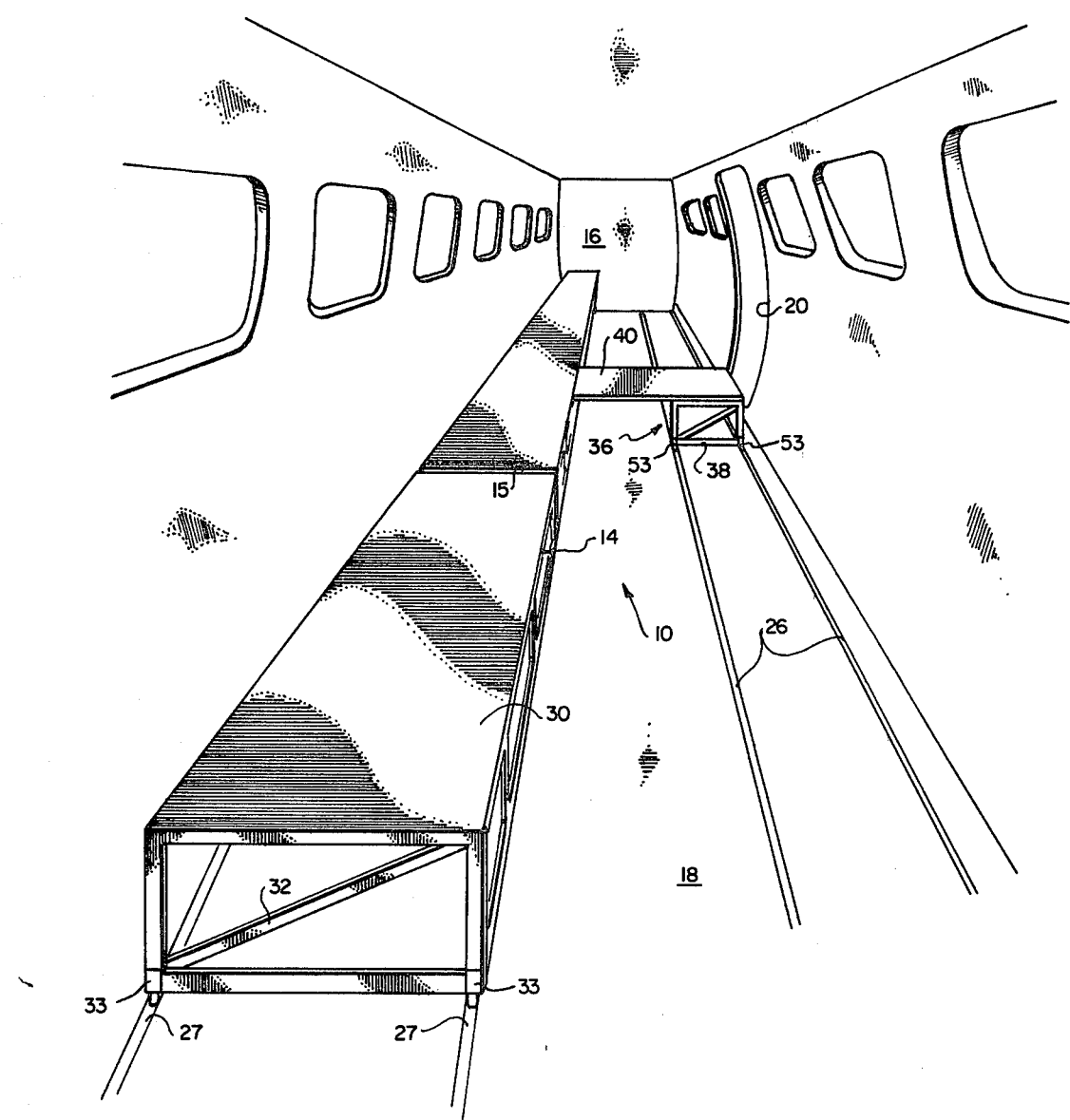
FIG. 1 is a perspective view of the interior of an aircraft in which one embodiment of the modular system of the present invention has been installed to carry cargo.

Reference is first made to FIG. 1 which is a perspective view of the interior of an airplane cabin 16 in which one embodiment of the modular system of the present invention, generally designated at 10, has been installed. Airplane cabin 16 includes a door 20 in the rearward portion thereof through which passengers and cargo are loaded. Two sets of tracks 26 and 27 are located in the floor of the airplane and are used to secure modular system 10 in place. Tracks 26 and 27 are standard tracks used in most light airplanes to secure the seats and other fixtures to the floor.

Positioned along the side of cabin 16 opposite door 20 is a removeable rack-like structure generally designated as 14 which is designed to support cargo in cabin 16. Structure 14 can be supplied with straps, clamps or other suitable means to secure cargo in place during transit. Structure 14 includes a frame 32 and a generally planar top 30 to support the cargo. Frame 32 is temporarily secured to tracks 27 in the floor 18 of cabin 16 by feet 33 which are designed to engage tracks 27. Thus, structure 14 can be secured in cabin 16 to transport cargo and can easily be removed so that other fixtures such as tables and chairs can be installed when the airplane is used for other purposes.

In the embodiment illustrated in FIG. 1, structure 14 is formed in two halves which are disengageably joined together at 15. Accordingly, structure 14 can be divided in half during installation or removal. In smaller airplanes, structure 14 can sometimes be formed as a single unit. In larger planes, it is usually advantageous to form structure 14 in two or more parts to facilitate handling during installation and so that structure 14 can pass through door 20.

Moveably secured to tracks 26 on the other side of cabin 16 is a loading ramp generally designated at 36. Ramp 36 is designed so that it can be moved along tracks 26 such that it is positioned in front of door 20 for loading and unloading cargo. When ramp 36 is not being used to load cargo, it can be moved away from door 20 to permit individuals to enter the cabin and to comply with the regulations of the Federal Aviation Agency that the doorway be unobstructed during take-off and landing. Ramp 36 is secured to tracks 26 by feet 53.

In the embodiment illustrated in FIG. 1, loading ramp 36 is formed from a base 38 and a foldable top 40 which extends from door 20 to the edge of top 30 of rack-like structure. Thus, cargo can be placed through door 20 onto top 40 of ramp 36 and then slid over onto rack-like structure 14. As discussed more fully hereinafter with respect to another preferred embodiment, a cart or stretcher having casters on the bottom thereof can be used to more easily move the cargo across ramp 36 and onto rack-like structure 14.

When ramp 36 is not being used to load or unload cargo, top 40 can be folded upright as discussed more fully hereinafter and ramp 36 can be used as a seat after it has been moved away from door 20.

Reference is next made to FIG. 2 which is a perspective view of the interior of an airplane cabin 16 illustrating a second preferred embodiment wherein the modular system of the present invention is used to transport patients in an air ambulance. In this embodiment, the rack-like structure forms a litter module generally designated at 24 which is used to support a stretcher 22.

Modular system 10 is designed such that the stretcher 22 can easily be loaded into cabin 16 through door 20 while a patient is lying thereon and can be secured onto litter module 24 during transport. In the embodiment illustrated in FIG. 2, litter module 24 is designed such that it can accommodate two stretchers although only one stretcher 22 is illustrated in the drawing. In smaller airplanes, litter module 24 has to be shortened such that it can only accommodate one stretcher.

A bench seat 28 is positioned in cabin 16 opposite litter module 24 and is secured to tracks 26 to provide a place for a nurse or medic to ride where they can attend to the needs of a patient during transport. Loading ramp 36 which is positioned in the rear of the cabin 16 can also serve as a seat for the nurse or medic.

Figure 4:
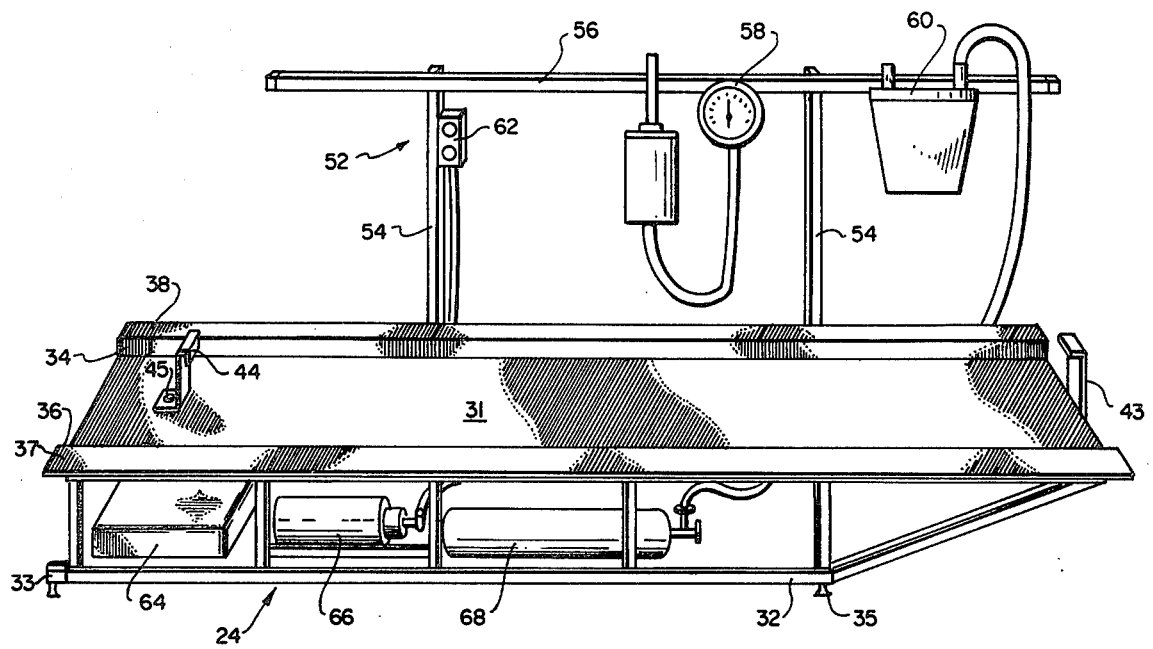
FIG. 4 is a perspective view of the litter module of the present invention which supports the stretcher and medical equipment in the airplane.

Reference is next made to FIG. 4 wherein a litter module 24 which is designed to accommodate only one stretcher is illustrated in a perspective view.

Litter module 24 includes a top 31 which is supported by a frame 32. In this preferred embodiment, frame 32 is formed from square tubing and is designed to support top 31 about one foot above the floor of the cabin. Frame 32 is anchored in the airplane cabin by feet 33 and 35 which are secured to tracks 27 (see FIG. 1) in the floor of the cabin.

Top 31 of litter module 24 is formed from a sheet of stainless steel or aluminum and is designed such that it acts as a track for stretcher 22 (see FIG. 2). The lateral edges of top 31 are bent upward to form sides 34 and 77 and then outwardly to form ledges 37 and 38. Finally, the edges 39 and 41 of top 31 (see FIG. 2) are bent inward at an angle so as not to leave a sharp edge exposed. As will be more fully discussed hereinafter, stretcher 22 is equipped with casters on the bottom thereof such that it can be rolled into the airplane. Sides 34 and 77 of top 31 serve as guide rails to guide stretcher 22 into position and to prevent the stretcher from rolling off litter module 24 once it is in place.

An instrument rack generally designated 52 is attached to the side of litter module 24 which is adjacent wall 17 of cabin 16 (see FIG. 2). Instrument rack 52 is formed from a series of posts 54 which are attached to frame 32 below top 31. Posts 54 extend approximately two feet above top 31 and a cross-bar 56 is attached to the upper ends of post 54. Instruments such as an oxygen regulator 58, a vacuum bottle 60, and an electrical outlet 62 can be attached to instrument rack 52. Different instruments can easily be clamped onto rack 52 depending upon the needs of the patient.

Inasmuch as essentially all the necessary medical instruments can be hung on rack 52, it is not necessary to make any permanent structural changes to add brackets or outlets in the walls of the airplane cabin.

The large pieces of equipment which are generally needed for emergency treatment of patients are stored in litter module 24 below top 31. For example, an invertor 64 to produce 120 volt electrical power, a vacuum pump 66, and an oxygen tank 68 can all be stored within frame 32. Inasmuch as all of the major equipment is stored directly in litter module 24, it is not necessary to make structural changes in the airplane as with the prior art systems where the large pieces of equipment were located in the nose of the airplane. Thus, the large expenses associated with the prior art systems to convert an airplane into an air ambulance are eliminated. Additionally, the equipment can easily be removed to allow the airplane to be used for other purposes when it is not being used as an air ambulance.

Referring again to FIG. 2, stretcher 22 is approximately fifteen inches wide so that it can fit through door 20 and includes a rectangular frame 46 formed from aluminum or steel tubing. Casters 42 are attached to at least the head and foot of stretcher 22 to provide a means whereby it can be rolled into the airplane. When positioned on litter module 24, casters 42 are situated between sides 34 and 77 of top 31 such that stretcher 22 cannot move from side to side.

A pad 48 is mounted on frame 46 to provide a cushioned surface on which a patient can lie. Inasmuch as stretcher 22 is narrower than conventional stretchers, side pads 49 and 50 are provided on the upper half of stretcher 22 to furnish additional width to support a patient's shoulders and arms. Side pads 49 and 50 are folded upward during loading so that the stretcher can pass through door 20. Thus, pads 49 and 50 also serve to protect the patient from rubbing against the edge of door 20 as he is being loaded or unloaded. When stretcher 22 is positioned on litter module 24, side pads 49 and 50 rest upon and are supported by ledges 38 and 37 of top 31.

Stretcher 22 is locked in place on litter module 24 by bracket 44 which hooks over the front rail 47 of frame 46 and is secured to top 31 by a wing-nut 45. A similar bracket 43 (see FIG. 4) is used to secure the back rail of frame 46 of stretcher 22.

Figure 5:
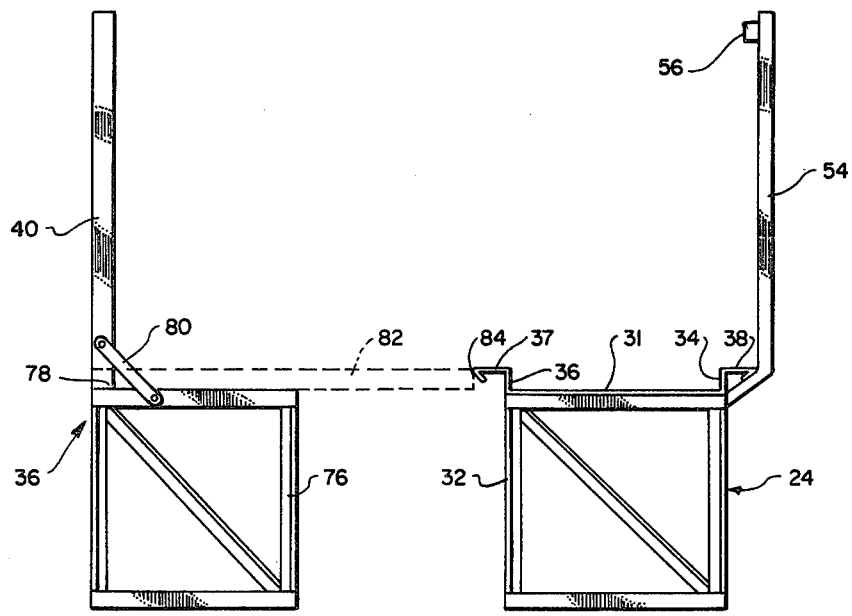
FIG. 5 is a cross-sectional view of the litter module and the loading ramp of the present invention wherein the ramp is formed by folding down the back of a movable seat.

In order to load a patient into or unload him from cabin 16, ramp 36 is utilized to guide stretcher 22 through door 20 and onto litter module 24. As discussed previously, ramp 36 is designed such that it can be moved along tracks 26 in the floor of cabin 16. Thus, in order to utilize ramp 36, it is first positioned in front of door 20. Cushions 70 and 72 which allow ramp 36 to be used as a seat are then removed. Top 40 of ramp 36 is hinged such that it can be folded down towards the interior of cabin 20. FIG. 5 illustrates how the top 40 of ramp 36 can be folded down to form the loading ramp for stretcher 22.

In FIG. 5, litter module 24 and ramp 36 are shown in cross-section. The bottom portion of ramp 36 is formed from a frame 76 which can be formed from square tubing and covered with sheet metal, paneling, or other material to match the decor of the cabin. Top 40 extends upwardly from frame 76 and is hinged at 78 with a piano-type hinge. A locking bar 80 is utilized to hold top 40 in the upright position when ramp 36 is not being utilized for loading. After cushions 70 and 72 (see FIG. 2) have been removed from ramp 36, locking bar 80 can be disengaged and top 40 can be folded down into the position represented by dotted lines 82. When top 40 is in the lowered position, it extends from the door of the cabin to the edge 84 of top 31 of litter module 24. After the patient or patients are loaded into cabin 16, ramp 36 can be returned to its normal, upright position.

While the presently preferred embodiment for the loading ramp is designed such that it can also be used as a seat, it will readily be appreciated by those skilled in the art that other configurations could also be used. For example, a ramp which hooked over ledge 37 and was supported at the lower end by a pair of stationary or folding legs could also be utilized.

Reference is next made to FIG. 3 which illustrates the manner whereby stretcher 22 is loaded into cabin 16 of airplane 12. Once ramp 36 has been positioned in front of door 20 and top 40 has been lowered such that it can serve as a loading ramp, stretcher 22 is lifted by two or more attendants and the forward end 90 is placed through door 20 and onto top 40 of ramp 36. Stretcher 22 is then pushed forward by the attendant 94 holding the rearward end 92 of stretcher 22 until the casters have passed over ledge 37 of top 31. When the forward end 90 of stretcher 22 is positioned on top 31, attendant 94 can turn stretcher 22 as he continues to push it into cabin 16 such that forward end 90 of stretcher 22 progresses towards the forward end of cabin 16. Once rearward end 92 of stretcher 22 has passed through door 20, it is rolled across loading ramp 36 until it also is positioned above top 31. Stretcher 22 can then be rolled along top 31 until it is in the desired position where it is anchored in place by brackets 43 and 44 (see FIGS. 2 and 4). As can be seen from the foregoing, stretcher 22 can easily be loaded into cabin 16 without a nurse or attendant having to stoop down to carry the stretcher into the cabin.

Once the patient or patients have been loaded into airplane 12, top 40 is raised on ramp 36 and the ramp is moved away from door 20 so as to leave the door unobstructed during takeoff and landing. To remove a patient from plane 12, the above described steps are performed in reverse order.

As can be seen from the foregoing, the present invention provides a novel means for converting the interior of an airplane so that it can be used as an air ambulance or to haul cargo. Additionally, the present invention facilitates the loading of the patient or cargo in that a stretcher or cart can be lifted through the door and placed on a loading ramp such that it can be rolled or slid into place. While the present invention is designed to be easily installed in and removed from an aircraft, it will be appreciated that the system could also be installed permanently.

It will also be appreciated by those skilled in the art that the present invention is totally self-contained such that it can easily be installed in existing aircraft without making any significant structural modifications. Thus, the modular system of the present invention can be removed from the aircraft and the conventional seats and tables can easily be replaced should be desirable to convert the aircraft back to its standard configuration. The time required to install or remove the present invention is minimal. Hence, the interior of an aircraft can quickly be converted for different uses to more fully utilize the aircraft.

While the present invention has been described with reference to the presently preferred embodiments as illustrated in FIGS. 1-5, the present invention may be embodied in other specific forms without departing from its spirit or essential characteristics. The described embodiments are, therefore, to be considered in all respects only as illustrative and not restrictive, and the scope of the invention is thus indicated by the appended claims rather than by the foregoing description. All modifications or changes which come within the meaning and range of equivalency of the claims are to be embraced within their scope.

What is claimed and desired to be secured by United States Letters Patent is:

1. A system for converting the interior of a light aircraft so that cargo can be easily loaded or unloaded through a door of said aircraft, said system comprising:

first means for forming a rack-like structure onto which said cargo can be loaded, said first means comprising means for removably securing said rack-like structure to the interior of said aircraft; and second means, adjacent said first means, for forming a ramp from said door of said aircraft to said rack-like structure such that cargo can be moved over said ramp and onto said rack-like structure, said ramp comprising means for removably securing said ramp to said aircraft adjacent to said first means such that said ramp is movable with respect to said rack-like structure through the interior of said aircraft and essentially parallel to said first means, and said second means comprising means for releasably securing said ramp within said aircraft such that said ramp can be positioned between said door and said rack-like structure for use in loading and unloading cargo and such that said ramp can be positioned away from said door when said ramp is not in use.

2. A system for converting the interior of a light aircraft as defined in claim 1 wherein said first means comprises a frame having a generally planar top attached thereto.

3. A system for converting the interior of a light aircraft as defined in claim 1 wherein said means for removably securing said rack-like structure to the the interior of said aircraft comprises a first pair of tracks positioned in the floor of said aircraft and a plurality of feet attached to said rack-like structure such that said feet engage said tracks.

4. A system for converting the interior of a light aircraft as defined in claim 3 wherein said second means comprises a frame having a generally planar top attached thereto, said planar top extending from said door to said rack-like structure when said ramp is positioned between said door and said rack-like structure.

5. A system for converting the interior of a light aircraft as defined in claim 4 wherein said planar top is hingedly secured along one side thereof to said frame such that said top can be folded upward to form the back of a seat when said ramp is not in use.

6. A system for converting the interior of a light aircraft as defined in claim 4 wherein said means for releasably securing said ramp comprises a second pair of tracks positioned in said floor of said aircraft and means for selectively securing said ramp to said second pair of tracks.

7. In a light airplane having a door for entry into the interior of said airplane, and said interior being equipped with a first and a second pair of tracks longitudinally mounted to said interior on opposite sides thereof, a system of temporarily converting said interior so that cargo can be easily loaded or unloaded into or out of said interior, said system comprising:

first means for forming a rack-like structure onto which said cargo can be loaded, said first means comprising means for removably securing the rack-like structure to said first pair of tracks on a side of said interior opposite from said door; and second means, adjacent said first means, for forming a ramp from said door to said rack-like structure, said ramp being movable with respect to said rack-like structure, and said second means comprising means for removably securing said ramp to said second pair of tracks located on a side of said interior next to said door such that said ramp can be secured in a first position in front of said door when loading or unloading cargo and such that said ramp can be secured in a second position so as to leave said door unobstructed when not loading or unloading cargo.

8. A system for temporarily converting the interior of a light airplane as defined in claim 7 wherein said means for securing the rack-like structure to the first pair of tracks comprises a plurality of first feet attached to the bottom of the rack-like structure such that said first feet can engage said first pair of tracks.

9. A system for temporarily converting the interior of a light airplane as defined in claim 8 wherein said means for securing said ramp to said second pair of tracks comprises a plurality of second feet attached to the bottom of said ramp such that said second feet can engage said second pair of tracks.

10. A system for temporarily converting the interior of a light airplane as defined in claim 9 wherein said second means comprises a frame having a generally planar top attached thereto, said planar top extending from said door to said rack-like structure when said ramp is secured in said first position.

11. In a light aircraft having a single, as opposed to a double, door for entry into the interior of said aircraft, and the interior of said aircraft having a first and a second pair of tracks mounted to the floor on opposite sides thereof along its length and to which one or more passenger seats are removably mounted, a system for temporarily converting said interior so that a patient on a stretcher can be easily loaded or unloaded into and out of said interior, said system comprising:

first means for forming a litter module onto which said stretcher can be loaded, said first means comprising means for removably securing said litter module to said first pair of tracks; and second means, adjacent said first means, for forming a ramp from said door to said litter module, said ramp being movable with respect to said litter module, and said second means comprising means for removably securing said ramp to said second pair of tracks such that said ramp can be secured in a first position in front of said door when loading or unloading said patient and such that said ramp can be secured in a second position so as to leave said door unobstructed when not loading or unloading said patient.

12. A system for temporarily converting the interior of an aircraft as defined in claim 11 wherein said first means comprises a frame having a generally planar top attached thereto, said top having lips extending upwardly from the longitudinal edges thereof to form guide rails for said stretcher.

13. A system for temporarily converting the interior of an aircraft as defined in claim 12 wherein said frame comprises means for storing oxygen tanks, invertors, vacuum pumps, and the like for treating the patient during transport.

14. A system for temporarily converting the interior of an aircraft as defined in claim 13 wherein said frame further comprises a rack attached to a side of said litter module which is adjacent a wall of the aircraft, said rack extending above the top of said litter module to support medical equipment for treating the patient during transport.

15. A system for temporarily converting the interior of an aircraft as defined in claim 11 wherein the second means comprises a frame having a generally planar top hingedly attached thereto, said planar top extending from said door to said litter module when said ramp is secured in said first position.

16. A system for temporarily converting the interior of an aircraft as defined in claim 11 further comprising casters attached to the bottom of said stretcher such that said stretcher can be rolled across said ramp and onto said top of said litter module.

17. A system for temporarily converting the interior of an aircraft as defined in claim 16 wherein said top of said litter module further comprises fastening means for securing said stretcher such that it cannot move during transport.

18. A method for converting the interior of a light aircraft so that cargo can be easily loaded or unloaded through a door of said aircraft, said method comprising the steps of:

detachably mounting a rack-like structure along a first side of the interior of said aircraft; and positioning a ramp in said interior of said aircraft adjacent said rack-like structure, said ramp being movable through said interior in a direction essentially parallel with respect to said rack-like structure, and said ramp having a first position of adjustment in front of said door of the aircraft such that the ramp extends from said door to said rack-like structure and a second position of adjustment wherein said ramp is away from said door such that the door is unobstructed.

19. A method for temporarily converting the interior of a light aircraft as defined in claim 18 wherein said mounting step comprises securing the rack-like structure to tracks in the floor of said aircraft.

20. A method for converting the interior of a light aircraft as defined in claim 18 wherein said ramp comprises a seat having a back which is hingedly secured thereto and wherein the positioning step comprises moving the seat such that it is positioned in front of the door of the aircraft and folding down the back of the seat.

21. A method for converting the interior of a light aircraft so that cargo can be easily loaded into and unloaded out of said aircraft through a single door, said aircraft having two pairs of tracks mounted to said interior and running longitudinally along said interior and said method comprising the steps of:

detachably mounting a rack-like structure to a first pair of said tracks along a first side of the interior of said aircraft opposite said door; and slidably securing a ramp to the second pair of said tracks along a second side of said interior adjacent said door, said ramp being slidably movable along said rack-like structure, and said ramp having a first position of adjustment in front of said door such that the ramp extends from said door to said rack-like structure and a second position of adjustment wherein said ramp is away from said door such that the door is unobstructed.

22. A method for temporarily converting the interior of a light aircraft as defined in claim 21 wherein said ramp comprises a seat having a back which is hingedly secured thereto and wherein said method further comprises moving the seat such that it is positioned in front of the door of the aircraft and folding down the back of the seat prior to loading said cargo.

23. A method for converting the interior of a light aircraft such that the aircraft can be utilized as an air ambulance, said method comprising the steps of:
  detachably mounting a litter module along a first side of the interior of said aircraft opposite a door; and
  positioning a ramp in said interior of said aircraft adjacent said litter module, said ramp being movable in a direction essentially parallel to said litter module, and said ramp having a first position of adjustment in front of said door such that the ramp extends from the door to said litter module and a second position of adjustment wherein said ramp is away from said door such that the door is unobstructed.

24. A method for converting the interior of a light aircraft as defined in claim 23 wherein said mounting step comprises securing the litter module to tracks in the floor of the interior of said aircraft.

25. A method for converting the interior of a light aircraft as defined in claim 24 wherein said ramp comprises a seat having a back which is hingedly secured thereto and wherein the positioning step comprises moving the seat such that is is positioned in front of the door of the aircraft and folding down the back of the seat.

26. A method for converting the interior of a light aircraft as defined in claim 23 further comprising the step of placing a rack adjacent said litter module for supporting medical equipment used to treat patients during transport.

27. A method for converting the interior of a light aircraft as defined in claim 23 further comprising the step of obtaining a stretcher having casters on the bottom thereof, said stretcher being sufficiently narrow so as to pass through said door while in a horizontal position.

* * * * *